I. HIRSOHN.
BUCKET CLOSURE.
APPLICATION FILED MAR. 29, 1917.
1,328,672. Patented Jan. 20, 1920.
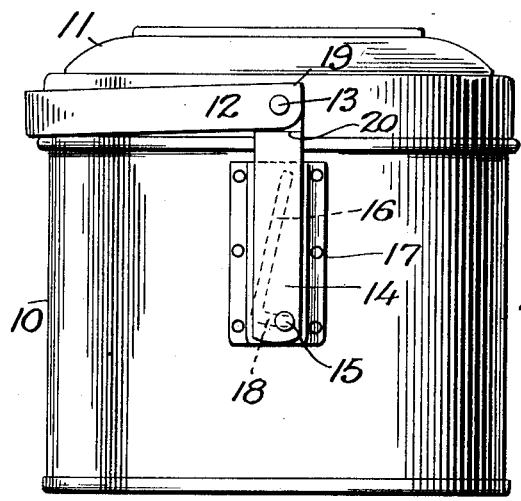
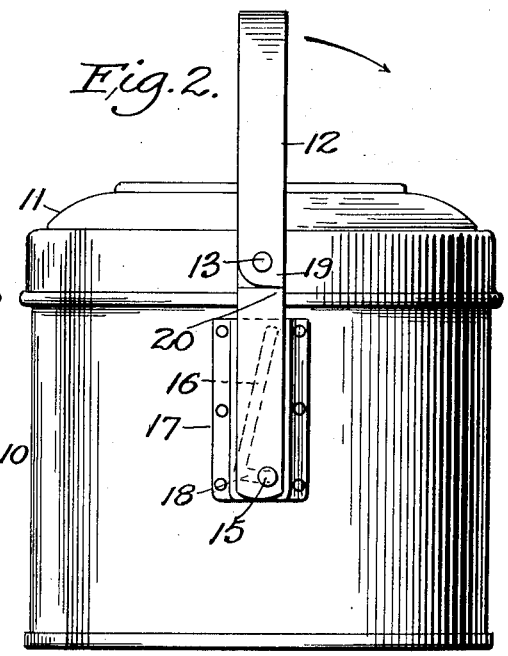
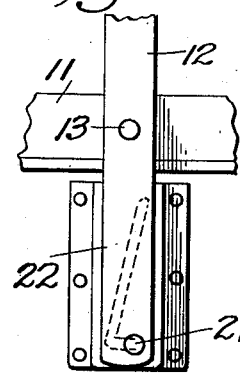
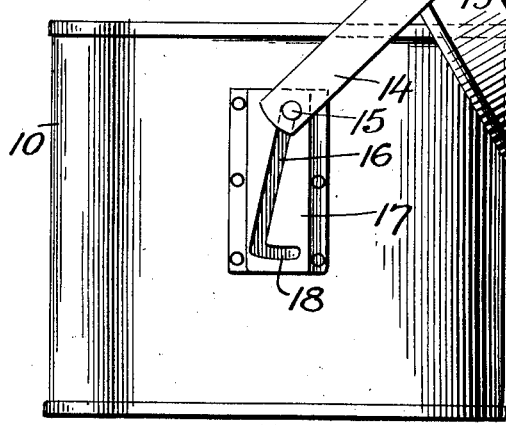
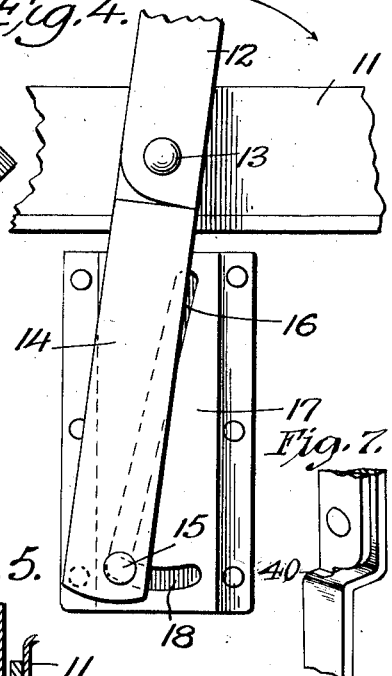
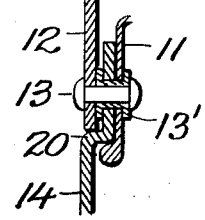
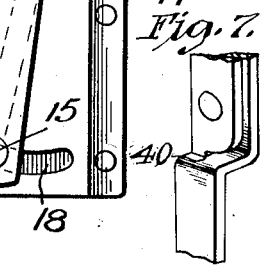
INVENTOR,
Isaac Hirsohn,
BY
James P. Duhamel.
ATTORNEY

UNITED STATES PATENT OFFICE.

ISAAC HIRSOHN, OF NEW YORK, N. Y.

BUCKET-CLOSURE.

1,328,672.　　　　　Specification of Letters Patent.　　Patented Jan. 20, 1920.

Application filed March 29, 1917. Serial No. 158,196.

*To all whom it may concern:*

Be it known that I, ISAAC HIRSOHN, a citizen of the United States, and resident of New York, in the county of New York and State of New York, have invented certain new and useful Improvements in Bucket-Closures, of which the following is a specification.

This invention relates to closures for receptacles with handles and especially to pails, buckets and similar containers where it is necessary to provide a cover or lid to confine the contents and prevent access until it is desired to fill or empty the same.

In garbage and ash pails it is desirable to not only lock the covers thereon for sanitary reasons but to provide means for attaching the lid to the pail so the latter may not be separated and lost as these covers are in most cases loosely held upon the pails, and it is obvious that when the latter are placed adjacent the house for collection purposes, stray animals are apt to remove the covers and spill the contents of the pails.

The object therefore of the invention is to secure the lid to the pail at times when it is not being emptied or filled, and it is thus secured when the pail is in either raised or lowered position. But when it is desired to remove the lid a short and simple movement of the bail will do it.

These and other details and objects of the invention are more fully described in the following specification, set forth in the claims and illustrated in the accompanying drawings, wherein:

Figure 1 is a side view of a bucket provided with the improved closure.

Fig. 2 is a similar view with the bail raised.

Fig. 3 is a view of the bucket with the bail released and the lid removed.

Fig. 4 is an enlarged view of the bail releasing means.

Fig. 5 is a sectional view through the lid and bail pivot.

Fig. 6 is a modified detail.

Fig. 7 is a detail view of another modification.

A preferred form of the closure is shown in Figs. 1 to 4 and in which the bucket or pail 10 is provided with the usual lid or cover 11 having pivoted to it at each side the bail 12 of semi-circular shape.

The pin 13 which pivots each end of the bail to the lid passes through an eyelet 13' which also attaches to the lid a link 14, as best shown in Fig. 5, the link having at its lower end the stud 15 projecting inward and into a slot 16 of a plate 17 on the inner side of which the stud is headed to prevent its removal. The lower end 18 of the slot 16 is substantially horizontal while the upper part is slightly inclined from the vertical, the two extremities of the slot, however, being in line with the pivot 13 and directly beneath it.

When the bail is being used to carry the bucket, the weight of the latter is borne by the two studs 15 and as long as the bail and the link are retained in their vertical positions the stud will be located in the horizontal part of the slot, but if the bail is tilted in the direction of the arrow in Fig. 2, or to the right, the corner 19 at the lower end of the bail will act upon the shoulder 20 of the link and also swing the link on the pivot 13, causing the stud 15 to move to the other end of the horizontal slot 18 when the weight of the bucket causes the latter to drop and the stud to run to the upper end of the slot 16, raising the lid from its closed position.

This action is shown in Fig. 3 and with the bail and lid further tilted so that the contents of the bucket may be dumped or access be given thereto, while Fig. 4 shows the release about to be effected.

As may be seen in Fig. 6 the link may be dispensed with and the lower ends of the bail extended so that the studs 21 play in the slots 22 but normally remain in the horizontal part of the slot. But upon the swinging of the bail to the right, the same is released and moves away from the bucket with the lid to give access to the bucket.

It is obvious that other modifications in the construction and arrangements of the parts may be resorted to without departing from the essential features above described or from the scope of the appended claims.

What I claim as new is:

1. In a bucket closure, the combination of a bucket having slots at its sides, a lid, a bail pivoted at the sides of the lid, and means connected with the bail and working in the slots to release the said lid and bail when the latter is tipped.

2. In a bucket closure, the combination of a bucket having slots at its sides, a lid for the same, a bail pivoted at the sides of the lid, locking means pivoted to the lid and having lower ends adapted to play in the slots, and means on the bail adapted to disengage the locking means when the bail is rocked.

3. In a bucket closure, the combination of a bucket having L-shaped slots at its sides, a lid for the bucket, pivots at the sides of the lid, locking means depending from the pivots and having lateral ends to play in the slots, and means connecting the bail and the locking means to release the latter when the bail is tipped.

4. In a bucket closure, the combination of a bucket having L-shaped slots at its sides, a lid, pivots at opposite sides of the lid, a bail on the pivots, eyelets on the pivots, links depending from the eyelets and pivots and having inwardly extending pins to enter the slots, and means connecting the ends of the bail and the links to swing the latter when the bail is tipped so that the pins are free to travel up the vertical end of the slot.

5. In a bucket closure, the combination with a bucket having angular slots at its sides, of a lid, a bail, pivots at the sides of the lid for the bail, links depending from the pivots, eyelets interposed between the links and the pivots, shoulders on the links, means at the lower ends of the bail for engaging the shoulders, and inwardly extending pins at the lower ends of the links to play in the said angular slots.

6. In a bucket closure, the combination of a bucket, L-shaped slots at the sides of the bucket, a lid, a bail pivoted at the sides of the lid and carrying the bail, links depending from the pivots, lateral pins at the ends of the links and playing in the slots, shoulders on the links below the pivots, and corners at the ends of the bail adapted to operate on the shoulders to tip the links to move the pins from the horizontal sections of the slots.

7. In a bucket closure, the combination of a bucket, plates attached to the sides of the bucket and having L-shaped slots, a lid, pivots at the sides of the lid, links depending from the pivots and having pins to normally locate in the horizontal part of the said slots and lock the lid in its closed position, shoulders on the links, and a bail carried on the pivots and whose lower corners engage the shoulders when it is tipped in one direction to swing the said pins in the horizontal parts of the slots to allow them to travel up the vertical parts and release the lid.

Signed at New York in the county of New York, and State of New York, this 19th day of March A. D. 1917.

ISAAC HIRSOHN.